Sept. 4, 1951 E. ROCKOFF 2,566,966
WIENER PROCESSING APPARATUS
Filed April 15, 1947 3 Sheets-Sheet 1

INVENTOR
EDWARD ROCKOFF
BY
ATTORNEY

Sept. 4, 1951 E. ROCKOFF 2,566,966
WIENER PROCESSING APPARATUS
Filed April 15, 1947 3 Sheets-Sheet 2

INVENTOR:
EDWARD ROCKOFF
BY
ATTORNEY

Sept. 4, 1951  E. ROCKOFF  2,566,966

WIENER PROCESSING APPARATUS

Filed April 15, 1947  3 Sheets-Sheet 3

INVENTOR:
EDWARD ROCKOFF
BY
ATTORNEY

Patented Sept. 4, 1951

2,566,966

UNITED STATES PATENT OFFICE 2,566,966

WIENER PROCESSING APPARATUS

Edward Rockoff, Denver, Colo., assignor to
Minnie Levin, Cheyenne, Wyo.

Application April 15, 1947, Serial No. 741,668

19 Claims. (Cl. 99—261)

This invention relates to the preparation, processing, and conditioning for sale and use of certain types of casing-packed meat products, such as sausages, wienerwursts, frankfurters, and the like, and has as an object to provide a novel and improved system automatically applicable to progressively effect the linking, curing, cooking, washing, cooling, and ultimate link separation of stuffed casing lengths as delivered from a conventional stuffing machine.

A further object of the invention is to provide an improved system effective to automatically accomplish complete processing of meat-stuffed casing lengths independently of human handling or manipulation of the food products.

A further object of the invention is to provide an improved cyclic system continuously operable to successively engage straight lengths of meat-stuffed casing as delivered from a stuffing machine and to progressively subject the engaged casing lengths to processing steps effective to condition the cased material for sale and use as food.

A further object of the invention is to provide an improved construction and arrangement of means susceptible of actuation for the fully automatic processing of casing-packed meat products into condition for sale and use.

A further object of the invention is to provide improved apparatus effective to engage straight lengths of meat-stuffed casing as delivered from a stuffing machine and to progressively subject the so-engaged lengths to processing steps effective to condition the cased material for sale and use as food.

A further object of the invention is to provide improved apparatus effective to engage straight lengths of meat-stuffed casing as delivered from a stuffing machine with link-forming constriction of the so-engaged lengths and to progressively subject the link-characterized lengths to a succession of processing steps while maintaining the link-forming influences acting thereon.

With the foregoing and other objects in view, my invention consists in the processing system, and in the construction, arrangement, and combination of elements constituting such a system, as hereinafter set forth, pointed out in my claims, and illustrated by the accompanying drawings, in which—

Figure 1:
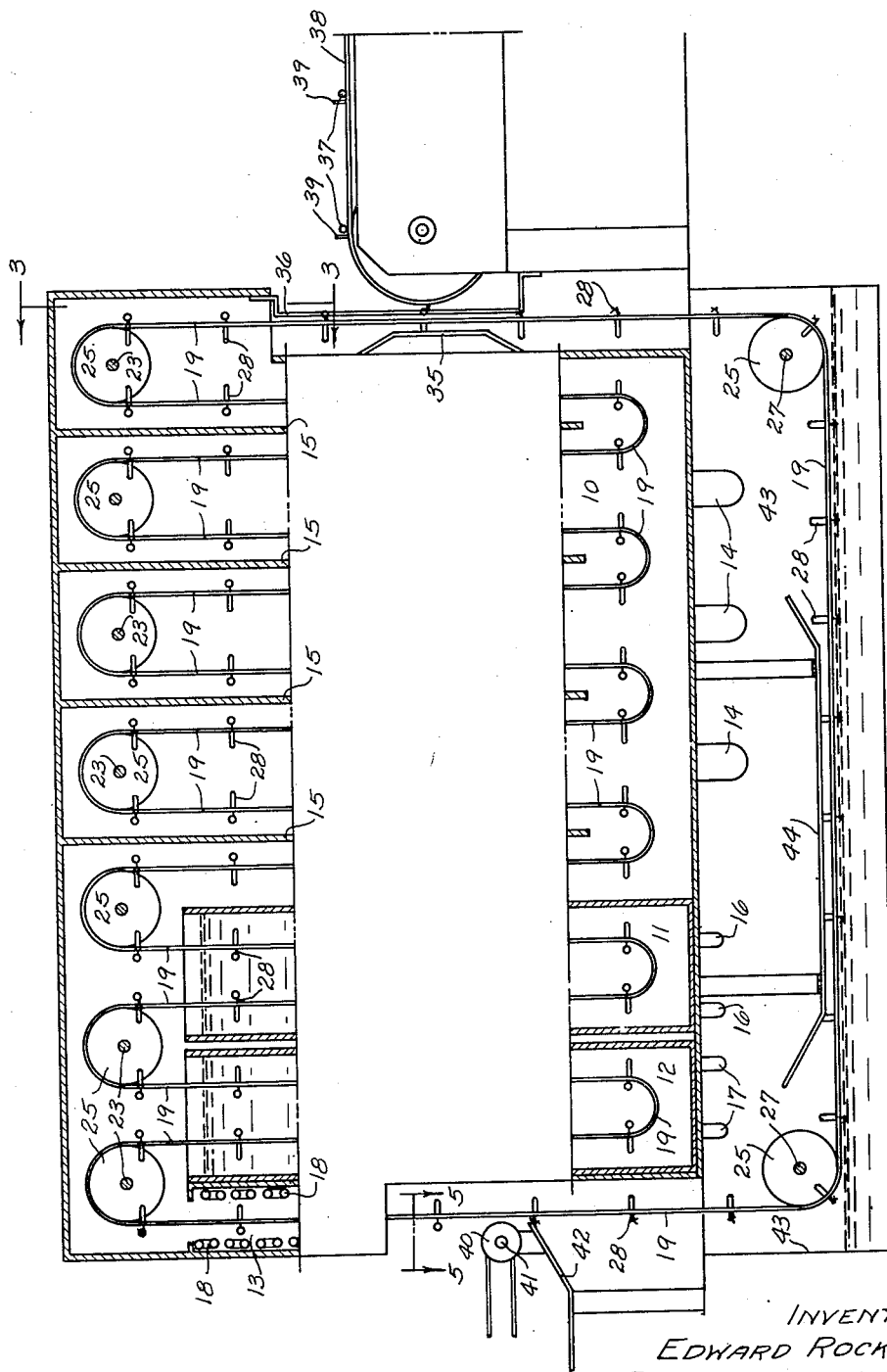
Figure 2:
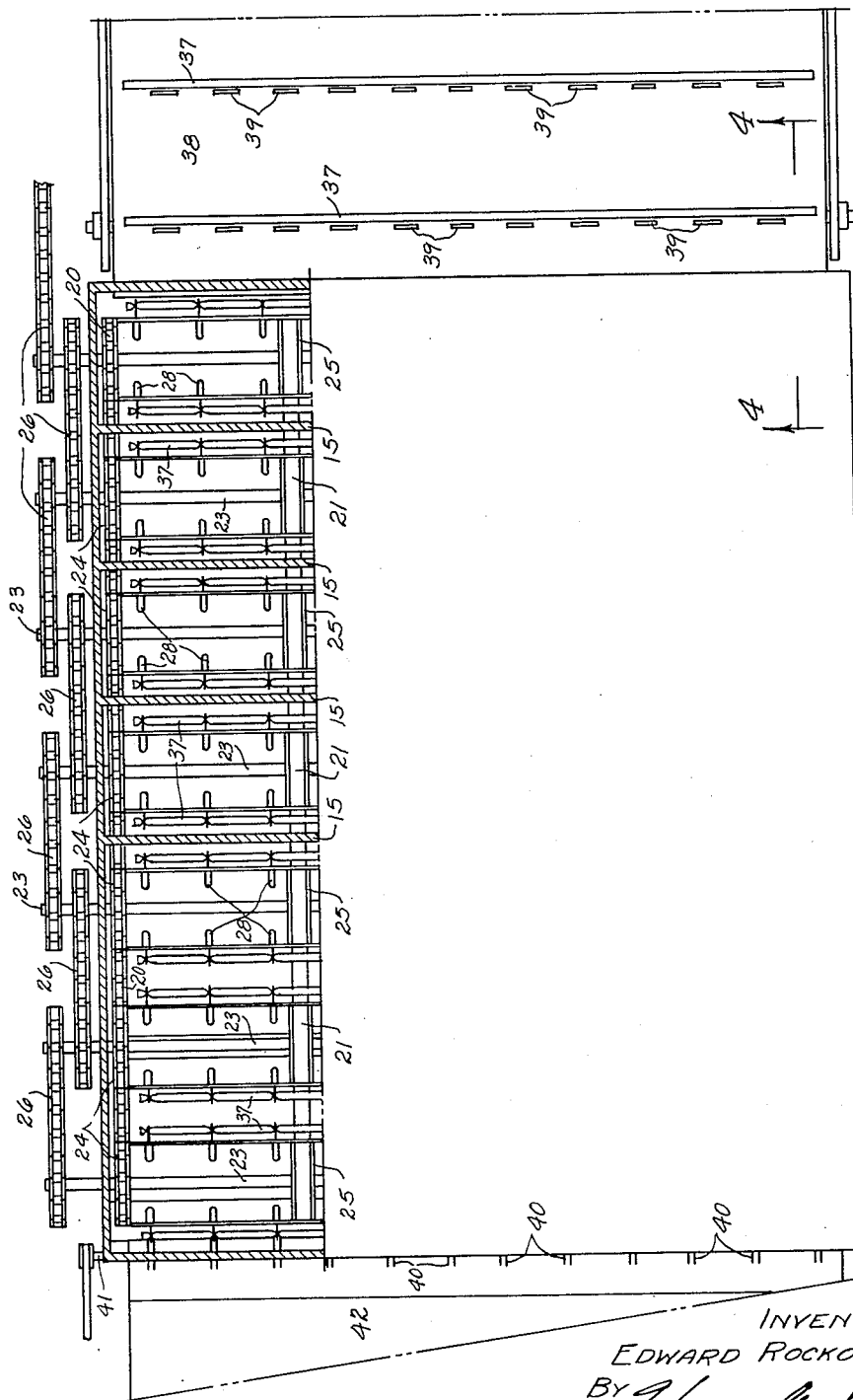
Figure 3:
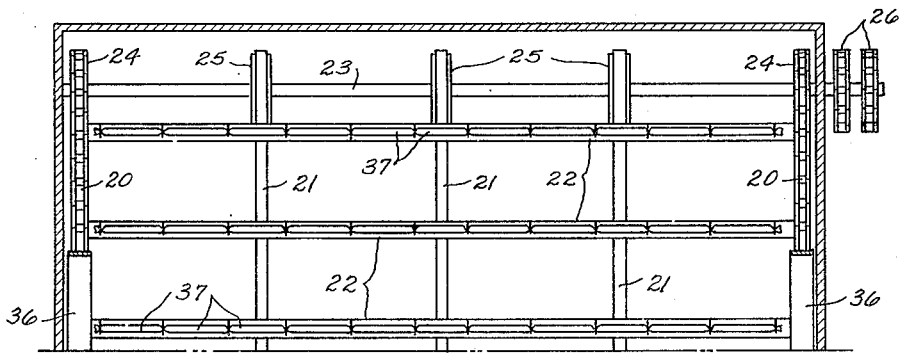
Figure 5:
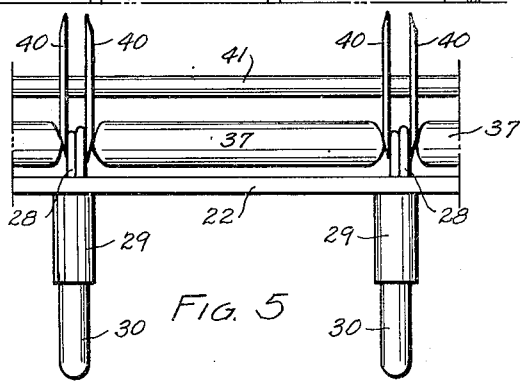
Figure 4:
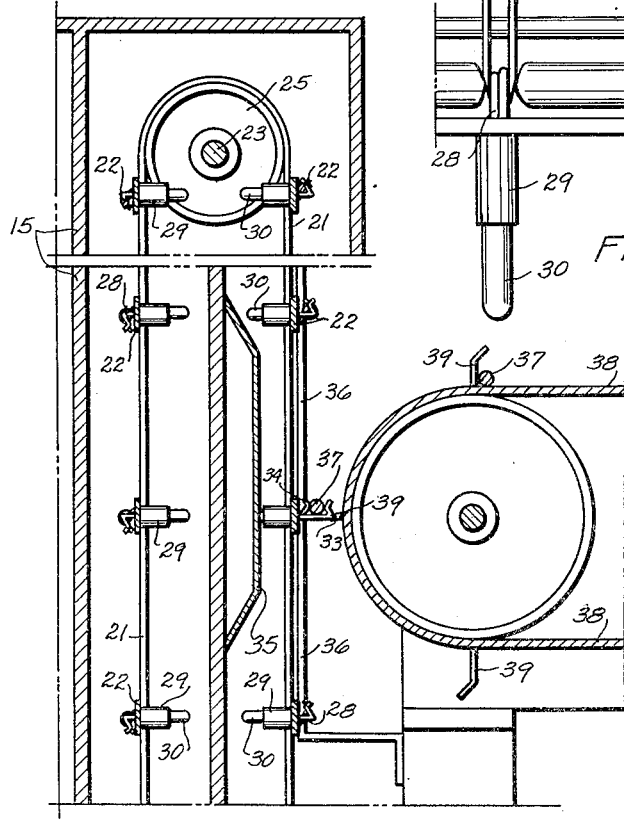
Figure 6:
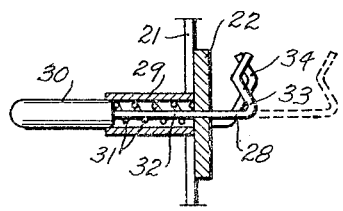

Figure 1 is a diagrammatic elevation, partly in section, of an association and relationship of elements constituting an operative system characterized by and exemplifying the principles of the invention. Figure 2 is a plan view, partly in section to disclose otherwise concealed features, of the showing of Figure 1. Figure 3 is a fragmentary cross section, taken substantially on the indicated line 3—3 of Figure 1. Figure 4 is a fragmentary, detail section, on an enlarged scale and with portions broken away to conserve space, taken substantially on the indicated line 4—4 of Figure 2. Figure 5 is a fragmentary, detail plan, on an enlarged scale, of link separating and detaching means characteristic of the system as viewed from the zone approximately designated by the line 5—5 of Figure 1. Figure 6 is a fragmentary detail section, on an enlarged scale, axially through one of the functionally typical hook units characteristic of the improved system.

A variety of particular food products is of common manufacture and general use in the form of long, tubular casings of either natural or synthetic materials charged with diversely-compounded forcemeats and subsequently worked, cured, cooked, and otherwise processed into cylindrical, round-end links typical of the commodities known as sausages, wienerwursts, frankfurters, and the like. Through the actuation of conventional stuffing machines, and analogous apparatus, raw forcemeat mixtures are compacted within and to fill casing lengths of suitable size in a manner productive of straight, stuffed units on the order of thirty feet in length and of substantially uniform, uninterrupted diameter. The stuffed units as now delivered from the stuffing apparatus are conventionally subjected to a series of processing steps through manipulations requiring repetitious human handling, conditioning and feeding of auxiliary agencies, and an economically excessive expenditure of labor time, to obviate which the instant invention is directed to the provision of a system and means effective to complete the processing of the stuffed units without recourse to human agents and in a continuous cyclic manner characterized by marked conservation of time and labor.

As represented in the drawings, a succession of chambers or compartments, of specific constructions and arrangements suited to their respective processing functions, is alined in a generally unitary assembly in an order and relationship suited to accomplish the results desired. The conventional processing of casing-confined meat products includes curing, cooking, washing, and chilling steps effected in the order stated, for which reason it is expedient to illustrate the typical embodiment of the invention as incorporating a curing chamber 10, a cooking compartment or vat 11, a washing compartment or vat 12, and a chilling chamber 13, all of substantially equal widths sufficient to accommodate the usual stuffed casing lengths and alined in a structurally unitary assembly. The curing chamber 10 is customarily employed to effect "smoking" or analogous treatment of the meat products, for which purpose said chamber may be served through its lower member by one or more conduits 14 by means of which the "smoking" gases or agents may be introduced to rise into and be retained within the chamber upper portion in a customary manner. When, as is frequently the case, it is desired to subject the food products undergoing processing to curing effect at varying temperatures and concentrations of the curing agents, the chamber 10 may be subdivided by means of transverse partitions or baffles 15 into a series of separate compartments into which separate conduits 15 deliver the variously-conditioned agents, as typified by the Figure 1 showing. The cooking step of the processing cycle is commonly accomplished through immersion of the food material within a body of water maintained at elevated temperature, and the compartment 11 of the assembly wherein said step is effected is hence illustrated as an open-top vat arranged to house a water charge which may be heated and circulated in any expedient manner through and by means of agencies represented by the showing of conduits or pipes 16 operatively engaging through the vat bottom. Similarly, the washing step of the processing cycle may be effected by passing the food products through a body of fluid, such as water or other solution, and may be additionally operative to cool and surface-color the material under treatment when and as the solution is conditioned to that end, wherefore it is feasible to represent the washing compartment 12 as an open-top vat adjacent the analogous unit forming the compartment 11 and as furnished with operatively-related pipes or conduits 17 through which circulation of the vat charge may be had for desired control of the charge temperature and composition. The chilling step of the processing cycle usually follows the washing step and is applied to finally condition the food material save for such subsequent operations as are strictly mechanical, hence the compartment 13 is represented as immediately adjacent the washing stage 12 and as equipped with refrigerating coils 18 defining a passage through the compartment wherein the temperature may be regulated and controlled as a consequence of refrigerant circulation through said coils in accordance with well-known practice. The structural showing of the compartments 10, 11, 12 and 13 is neither exhaustive nor limitative, since it merely typifies a succession of alined processing chambers effective to progressively apply a series of selected conditioning steps to material passed therethrough, and the precise nature of the conditioning accomplished in a given chamber or compartment of the assembly is widely variable within and beyond the scope of the conventional processing sequence above set forth; it being within the contemplation of the invention that other and different specific processing steps may be substituted for or added to those enumerated through the adaptation or addition of chambers and compartments, so long as the progressively-adjacent, alined relationship thereof is preserved.

Whatever may be the particular construction, processing characteristic, or structural interrelation of the alined chambers comprised within the assembly, the latter is designed and arranged to cooperate with and be traversed by an endless, open or skeleton web 19 supported and power-driven for travel through and successive exposure of its length sections within each of the assembly chambers. The web 19 may be of any specific form and construction suited to effect its operative purposes, and is typically illustrated as comprising a pair of like, endless, sprocket chain members 20 disposed in spaced, parallel relation to form the web side margins, a plurality, in this instance three, of endless, flexible strips 21 linearly equal to the chains 20 uniformly spaced apart between and in parallel relation with said chains, and a succession of rigid bars 22 end-fixed to and bridging between the spaced chains 20 perpendicular to the latter in a uniform spacing longitudinally of the web and in fixed engagement with the strip 21 points they overlie. The web 19 is preferably formed to a width just exceeding the length of the stuffed casing units to be processed and susceptible of accommodation within the chamber assembly, and to a length greatly exceeding the double length of said assembly, for reasons that will hereinafter appear. To support and operatively mount the web 19 in the desired relationship with the chamber assembly, a plurality of like shafts 23, each equipped with chain sprockets 24 and wheels 25 fixed thereto in spaced relation suitable for engagement with the chain 20 and strip 21 elements of the web, is journaled in spaced, parallel relation transversely of the chamber assembly upper portion in such number and individual relative disposition as may be pertinent to give effect to the purposes and principles of the invention; said shafts 23 being operatively interconnected, as by means of chain and sprocket linkage 26, for simultaneous rotation in a common direction and at uniform peripheral speed of their elements 24 and 25 responsive to the application of power from any convenient source or supply, not shown. One of the shafts 23 is related with the input end of the chamber assembly so as to dispose the trailing portion of the web 19 engaged thereover as an approximately vertical run exteriorly paralleling and spaced outwardly from the major portion of the adjacent chamber end and entering the chamber through a hood extension formed on the said chamber end upper portion, while another of said shafts 23 is related with the output end of the chamber assembly so as to direct the leading portion of the web 19 engaged therewith as an approximately vertical run traversing the chamber 13 between the coils 18 thereof and emerging from the chamber assembly in outwardly-spaced, parallel relation with the adjacent assembly output end lower portion. The vertical web 19 end runs exterior to the chamber assembly extend downwardly below the assembly floor or bottom level and there each engage with and partially about elements 24 and 25 of shafts 27, in all respects similar to the shafts 23 and in synchronous driven relation with the latter, so as to direct and drive the length of web 19 therebetween as a return run exteriorly below the chamber assembly.

The various processing steps effectuated in the chambers 10, 11 and 12 requiring differing time periods of food product exposure in the respective chambers, and it being inexpedient to drive various sections of the web 19 at differing speeds, the desired variation of such time exposure is effectively accomplished by arranging the number and disposition of the shafts 23 intermediate the chamber assembly ends to permit draping of the web 19 thereover as a series of slack bights or loops successively depending between adjacent shafts within the respective chambers in such specific number and depending lengths as will provide for retention of a given transverse zone of the web within a given chamber for the requisite length of time at the driven speed of said web. The representative arrangement according to Figure 1 shows four web 19 slack bights of the same length accommodated within the chamber 10, one similar bight within the chamber 11, and one other similar bight within the chamber 12, with which arrangement longitudinal actuation of the web at uniform linear speed operates to expose a given web transverse zone within the curing chamber for a determinable time period approximately four times as great as that during which said zone is subsequently exposed to the processing effects characteristic of the chambers 11 and 12. Obviously, the number and length of the slack bights depending from between adjacent shafts 23 may be adjusted and varied in a given installation in relation to the web driven speed to establish any desired exposure time ratio or proportion for travel of a web zone through the successive chambers, the typical showing of the drawings being in no sense limitative in its disclosure of a relationship pertinent to processing of the particular nature set forth.

The web 19 functions to engage with and hold the food products to be processed during translation of said products through the successive processing steps and is hence equipped with means operatively carried by the bars 22 for such purpose. A further conditioning step common to the preparation of meat-stuffed casing products is the sub-division, by means of circumferential, deep constrictions uniformly spaced along the casing length, of the stuffed unit into generally cylindrical, end-rounded, uniform links or sections prior to the curing and cooking of the material, and it is hence desirable that the means for attaching the casing lengths to and for travel with the web 19 be capable of effecting and maintaining such constrictive sub-division to ultimate completion of the processing cycle. Typical of means, susceptible of wide variation in detail, for constrictively gripping a stuffed casing held thereby in mounted relation with the web 19, the showing of Figure 6 illustrates a hook 28 automatically actuatable between open and closed positions as an incident of web 19 travel. As shown in association with a bar 22, each of the hooks includes a tubular sleeve 29 fixed at one end to and projecting from the face of the bar 22 disposed for travel in opposition to the chamber assembly end walls, a plunger 30 reciprocable within the sleeve 29 and terminating in a rounded or roller-equipped end projecting outwardly beyond the sleeve free end, an expansive coil spring 31 within said sleeve to urge the plunger outwardly therefrom, a stem 32 fixed to said plunger and traversing said sleeve and the bar 22 to terminate on the side of said bar remote from the sleeve in an angularly-related finger 33, and a complementary finger 34 fixed to the bar 22 or the sleeve 29 for hook-completing cooperation with the finger 33. The fingers 33 and 34 are disposed in close, relatively-slidable adjacency and are so conformed as to cooperatively define a restricted opening or clearance therebetween adjacent the stem 32 junction with its finger 33 when the plunger 30 is at the outward limit of its range of travel relative to the sleeve 29, and to separate a distance adequate for the reception of a stuffed casing diameter when the plunger is moved inwardly of the sleeve against the pressure of the spring 31, free ends of the fingers 33 and 34 preferably being inclined as shown to assist in guiding a casing to a seat between the finger base portions. As shown, or in a construction functionally analogous thereto, a series of hooks 28 is mounted longitudinally of each bar 22, and hence transversely of the web 19, in a uniform spacing therealong definitive of the desired link or section length and in such relation with the associated bar as will direct the fingers 33 and 34 longitudinally and in the direction of web 19 travel from their base connections. It is expedient to charge the web 19 with the casings to be processed as the web bars 22 move upwardly along the vertical web uprise at the web-entering end of the chamber assembly, and such charging is readily accomplished by separating the fingers 33 and 34 of all of the hooks 28 on a given bar to define an upwardly-opening channel transversely of the web and simultaneously feeding a casing length into said channel. The hooks 28 of the respective bars 22 being alined longitudinally of the web, it is expedient to provide cam tracks 35 in fixed projecting relation with the chamber assembly end adjacent the web exterior uprise and in position to engage the free ends of and axially displace successive plungers 30 moving with the web, so that, as a given bar 22 is caused to move past the cam tracks 35, the fingers of all of the hooks 28 carried by said bar are urged into a separation receptive of a casing length and are held in such separation as the bar is carried past a casing feeder operable to seat a casing in the channel so opened. To assure effectiveness of the cam track action, guide plates 36 secured to fixed elements of the assembly may be disposed to slidably engage outer faces of the web 19 marginal chains 20 in opposition to the cam tracks and in position to function as abutments against which the cam track plunger displacement is effective to open the hook fingers. Obviously, when the hooks 28 are carried beyond the cam tracks 35 with a casing length 37 seated between the separated hook fingers, the released pressure of the hook springs 31 operates to retract the finger 33 of each hook relative to the associated finger 34 and to constrict the engaged zone of the casing while closing the hook against escape of the casing therefrom. Various specific constructions of feeders may be provided in operative association with the web uprise of the apparatus shown and described to automatically deliver casing lengths 37 to the open-hook seats of the successive web bars 22, a typical and practical arrangement of such means being illustrated as a horizontal conveyor belt 38 disposed to deliver perpendicularly to the web 19 uprise opposite the cam tracks 35 and adapted to receive successive casing lengths 37 from the stuffing apparatus transversely of its upper run, and transversely-alined, spaced stops, hooks, or dogs 39 outstanding in rows spaced longitudinally of the conveyor adapted to be rotated past and in clearing relation with the rows of web hooks 28 in such manner as to transfer a casing length engaged with a given row of the elements 29 to a seat between the separated fingers of a row of hooks 28 synchronously moving in the opposite direction; the drive of the conveyor 38 being so correlated with that of the web 19 as to bring the successive rows of hooks 28 into casing-transferring relation with the successive rows of elements 39 in a predetermined relationship most advantageous for the purpose.

Upon completion of their processing, the linked casing lengths 37 emerge from the chamber assembly with the descending vertical run of the web 19 in maintained engagement with the hooks 28 thereof, from which hooked engagement it is a simple matter, the separable hook fingers now being directed to open downwardly, to drop the casing lengths to an inclined plane, conveyor, or the like, through the agency of cam tracks disposed to engage the hook plungers and open the hooks, in the manner previously described. However, it is considered more desirable to separate the processed lengths into the links or sections defined between the hook constrictions, to which end it is expedient to provide a suitable cutter, such as a plurality of circular knives 40 fixed to and in spaced relation along a shaft 41, disposed transversely of the chamber assembly output end beneath the chamber 13 and in such relation with the path of web 19 travel as to engage a cutter blade with the successive casing lengths 37 on each side of each hook 28 engagement therewith as the said web travels past the cutter location, thereby cutting through the constricted casing zones for severed release of the processed casing links or sections as the cutter is made effective through rotation of its shaft 41; the so-detached casing elements being received on an inclined plane 42 or equivalent member arranged to transfer said elements to packaging, storing, or other disposition.

When a cutter arrangement is employed for link separation of the casing lengths, a very short section of the constricted casing zone is retained in and must be removed from each of the hooks 28, and, in any event, cleansing and sterilization of the web 19 elements at any time in contact with the food products is in order, both of which conditioning operations may be readily and conveniently accomplished automatically by providing a washing vat 43 disposed to be traversed by a suitable section, such as the return run, of the web and by locating cam tracks 44 for finger-separating reaction against the plungers 30 of the hooks 28 as the latter are drawn through a bath within the vat 43; the use of heaters, steam jets, agitators, and particularly-compounded bath solutions effective to further and enhance the conditioning accomplished within the vat 43 being well-known refinements susceptible of application as supplements to the performance of the elementary operative associations disclosed.

The typical elements and operative relationships hereinbefore described constitute a system susceptible of fully automatic actuation and correlation to receive meat-stuffed casings emerging from conventional stuffing machines and apparatus and to subsequently and progressively link-form, cure, cook, wash, chill, and link-separate such casings in fully processed form ready for commercial use, all without any necessity or occasion for human handling of the food products during or as an incident of any processing step and in a continuous, cyclic manner characterized by high economy of time and labor. The operative principles and apparatus of the system permit of wide adaptability and adjustment to effectively embrace varying numbers of variously time-related processing steps and to desirably condition casing-type food products of widely-diverse size, form, and particular composition, and the said system, in a multiplicity of specific constructions, is readily installable as an advantageous facility in processing plants of differing capacities either separate from or in operative conjunction with existing curing and processing rooms and chambers.

Since many changes, variations, and modifications in the particular form, construction, and arrangement of the elements shown and described may be had without departing from the spirit of my invention, I wish to be understood as being limited solely by the scope of the appended claims, rather than by any details of the illustrative showing and foregoing description.

I claim as my invention—

1. A system of the character and for the purposes described, comprising a succession of processing chambers, an endless, skeleton web traversing said chambers, means for steadily advancing said web in one direction relative to and through said chambers, a succession of like means spacedly carried by and transversely of said web each characterized by elements constrictively engageable at a plurality of spaced points with, to thereby mark as a series of links and to web-mount a straight, initially-cylindrical stuffed casing length, and means for separating the so-marked casing sections as independent links from their web mountings after transit through said chambers.

2. A system of the character and for the purposes described, comprising a succession of alined, separate, functionally-distinct, processing chambers, an endless, skeleton web operatively traversing all of said chambers in chamber-retained, specific lengths proportioned to the relative time periods of the chamber processing phases, means for advancing said web with uniform linear velocity in one direction relative to and through said chambers, a succession of like carrier assemblies longitudinaly spaced apart on and fixed transversely of said web each characterized by elements constrictively engageable at a plurality of spaced points with, to thereby mark as a series of links and to web-mount a straight, initially-cylindrical stuffed so-marked casing length, and means for separating the casing sections as independent links from their mounting assemblies after transit through said chambers.

3. A system of the character and for the purposes described, comprising a succession of alined, separate, functionally-distinct, processing chambers, an endless, skeleton web traversing said chambers, means for steadily advancing said web in one direction relative to and through said chambers, a succession of like carrier assemblies longitudinally spaced apart on and fixed transversely of said web each characterized by elements constrictively engageable at a plurality of spaced points with and to web-mount a stuffed casing length, means effective as an incident of web travel to automatically condition the elements of each carrier assembly for the reception of a casing length exteriorly adjacent the web-entering end of the chamber succession, means for synchronously feeding casing lengths to the successively-conditioned carrier assemblies, and means exteriorly adjacent the web-exiting end of the chamber succession automatically reactive to web travel to separate the casing sections from between the elements of their carrier assemblies after transit through said chambers.

4. A system of the character and for the purposes described, comprising a succession of alined, separate, functionally-distinct, processing chambers, an endless, skeleton web operatively traversing all of said chambers in chamber-retained, specific lengths proportioned to the relative time periods of the chamber processing phases, means for advancing said web with uniform linear velocity in one direction relative to and through said chambers, a succession of like carrier assemblies longitudinally spaced apart on and fixed transversely of said web each characterized by elements constrictively engageable at a plurality of spaced points with and to web-mount a stuffed casing length, means effective as an incident of web travel to automatically condition the elements of each carrier assembly for the reception of a casing length exteriorly adjacent the web-entering end of the chamber succession, means for synchronously feeding casing lengths to the successively-conditioned carrier assemblies, and means exteriorly adjacent the web-exiting end of the chamber succession automatically reactive to web travel to separate the casing sections from between the elements of their carrier assemblies after transit through said chambers.

5. A system as set forth in claim 4, wherein said web has a width approximating the length of the stuffed casing units to be processed and is supported by and in operative engagement over synchronously-driven, rotatable members axially perpendicular to the direction of web travel in spaced parallelism adjacent the respective chamber upper ends; whereby to dispose at least one freely depending bight of said web interiorly of each chamber.

6. A system as set forth in claim 4, wherein said web is supported by and passes in operative engagement over synchronously-driven, rotatable members axially perpendicular to the direction of web travel in spaced parallelism adjacent the respective chamber upper ends, and the specific length of the web within a given chamber is determined by the length and number of bights freely depending interiorly of the chamber as web slack between adjacent web-supporting, rotatable members.

7. A system as set forth in claim 4, wherein each of the carrier assemblies mounts a series of like hook members uniformly spaced apart transversely of the web and each characterized by coacting, relatively-movable members separable to define an upwardly-opening, casing-receiving seat at times and closable with positive holding and constrictive effect on and about a narrow zone of a casing engaged therein.

8. A system as set forth in claim 4, wherein the carrier assemblies mount hook members characterized by coacting, relatively-movable members separable at times to define an upwardly-opening, casing-receiving seat, and the means effective to condition said assemblies for casing reception consists of cam tracks fixed adjacent an upward, chamber-entering run of the web for member-separating engagement with said hooks as the latter move with the web.

9. A system as set forth in claim 4, wherein the means for feeding casing lengths to the carrier assemblies consists of a table disposed to receive and support stuffed casing lengths in progressively remote, parallel relation with and transversely of the chamber-entering web run, and casing-transfer means associated with said table in operative synchronism with the web travel for the successive delivery of the table-supported casing lengths to the travel path of the hook-opened carrier assemblies.

10. A system as set forth in claim 4, wherein the means for separating casing sections from between the elements of the carrier assemblies comprises cutters operatively adjacent the path of web travel at the web-existing end of the chamber succession and in position to engage as an incident of web travel with and to sever the successive casing lengths on each side of each carrier element constrictively engaging therewith.

11. In a system of the character described, an alined succession of separate, functionally-distinct, processing chambers, an endless, skeleton web operatively traversing said chambers, means transversely of and longitudinally spaced along said web each characterized by elements constrictively-engageable at a plurality of spaced points with, to thereby mark as a series of links and to web-mount a length of stuffed casing, and means reactive to web travel for automatically effecting engagement of a casing length with the elements of each of said former means prior to entrance of the corresponding web zone within the first of the alined chambers.

12. In a system of the character described, an alined succession of separate, functionally-distinct, processing chambers, an endless, skeleton web operatively traversing said chambers, slack bights formed in said web to depend within said chambers for web length exposures therein proportioned to the time periods of the respective, chamber-effectuated processing steps, means for advancing said web with uniform linear velocity relative to and through said chambers, and means tranversely of and in spaced succession along said web automatically reactive to web travel for constrictively engaging successive lengths of stuffed casing at a plurality of spaced points each in transversely-mounted relation on and for travel with said web.

13. In a system of the character described having an alined succession of separate, functionally-distinct, processing chambers, an endless, skeleton web operatively traversing said chambers, slack bights formed in said web to depend within said chambers for web length exposures therein proportioned to the time periods of the respective, chamber-effectuated processing steps, means for advancing said web with uniform linear velocity relative to and through said chambers, and means transversely of and in spaced succession along said web automatically reactive to web travel for constrictively engaging successive lengths of stuffed casing at a plurality of spaced points each in transversely-mounted relation on and for travel with said web.

14. In a system of the character described having an alined succession of separate, functionally-distinct, processing chambers, an endless, skeleton web operatively traversing said chambers, and means for advancing said web with uniform linear velocity relative to and through said chambers, means transversely of and in spaced succession along said web automatically reactive to web travel for constrictively engaging successive lengths of stuffed casing at a plurality of spaced points each in transversely-mounted relation on and for travel with said web, and slack bights formed in said web to depend within said chambers for web length exposures therein proportioned to the time periods of the respective, chamber-effectuated processing steps.

15. In a system of the character described having an alined succession of separate, functionally-distinct, processing chambers, an endless, skeleton web operatively traversing said chambers, and means for advancing said web with uniform linear velocity relative to and through said chambers, carrier assemblies transversely of and in spaced parallelism longitudinally along said web each including a plurality of spaced hooks constrictively engageable about a stuffed casing length zone, means for automatically feeding casing lengths to the carrier assemblies in advance of their travel through said chambers, and means reactive to web travel for detaching said casings as link sections from between the hooks of said carrier assemblies subsequent to their travel through said chambers.

16. In a system of the character described having an alined succession of separate, functionally-distinct, processing chambers, an endless, skeleton web operatively traversing said chambers, and means for advancing said web with uniform linear velocity relative to and through said chambers, carrier assemblies transversely of and in spaced parallelism longitudinally along said web each including a plurality of separable-member, normally-closed hooks in spaced relation longitudinally thereof actuatable to upwardly-opening relation along the chamber-entering run of said web, cam track means on the web-entering end of the chamber assembly effective to engage with and open said hooks as an incident of web travel, means for feeding a casing length to each carrier assembly for reception by the hooks thereof when the latter are open, and means reactive to web travel for detaching said casings as link sections from such hooked engagement with the carrier assemblies subsequent to their travel through said chambers.

17. In a system of the character described having an alined succession of separate, functionally-distinct, processing chambers, an endless skeleton web operatively traversing said chambers, and means for advancing said web with uniform linear velocity relative to and through said chambers, carrier assemblies transversely of and in spaced parallelism longitudinally along said web each including a plurality of separable-member, normally-closed hooks in spaced relation longitudinally thereof actuatable to upwardly-opening relation along the chamber-entering run of said web, cam track means on the web-entering end of the chamber assembly effective to engage with and open said hooks as an incident of web travel, conveyor means operatively correlated with the speed of web travel perpendicularly delivering to the chamber-entering web run for feed of casing lengths to the carrier assemblies during open-hook condition thereof, and means reactive to web travel for detaching said casings as link sections from between the hooks of the carrier assemblies subsequent to their travel through said chambers.

18. In a system of the character described having an alined succession of separate, functionally-distinct, processing chambers, an endless, skeleton web operatively traversing said chambers, and means for advancing said web with uniform linear velocity relative to and through said chambers, carrier assemblies transversely of and in spaced parallelism longitudinally along said web each including a plurality of separable-member, normally-closed hooks in spaced relation longitudinally thereof actuatable to upwardly-opening relation along the chamber-entering run of said web, cam track means on the web-entering end of the chamber assembly effective to engage with and open said hooks as an incident of web travel, conveyor means operatively correlated with the speed of web travel perpendicularly delivering to the chamber-entering web run for feed of casing lengths to the carrier assemblies during open-hook condition thereof, and cutters adjacent the chamber-exiting web run engageable as an incident of web travel with the successive casing lengths on each side of each carrier assembly hook to sever said casings for detachment of the link sections thereof from their respective carrier asemblies.

19. In a system of the character described having an alined succession of separate, functionally-distinct, processing chambers, an endless, skeleton web operatively traversing said chambers, and means for advancing said web with uniform linear velocity relative to and through said chambers, carrier assemblies transversely of and in spaced parallelism longitudinally along said web each including a plurality of separable-member, normally-closed hooks in spaced relation longitudinally thereof actuatable to upwardly-opening relation along the chamber-entering run of said web, cam track means on the web-entering end of the chamber assembly effective to engage with and open said hooks as an incident of web travel, conveyor means operatively correlated with the speed of web travel perpendicularly delivering to the chamber-entering web run for feed of casing lengths to the carrier assemblies during open-hook condition thereof, and cutters adjacent the chamber-exiting web run engageable as an incident of web travel with the successive casing lengths on each side of each carrier assembly hook to sever said casings for detachment of the link sections thereof from their respective carrier assemblies; together with means traversable by the web return run exteriorly of the chamber assembly to automatically reopen the carrier assembly hooks for release of casing portions retained therein and to cleanse said hooks and web.

EDWARD ROCKOFF.

REFERENCES CITED

The following references are of record in the file of this patent:

UNITED STATES PATENTS

| Number | Name | Date |
| --- | --- | --- |
| 665,661 | Ketley et al. | Jan. 8, 1901 |
| 1,693,570 | Vale | Nov. 27, 1928 |
| 1,891,873 | Elbe | Dec. 20, 1932 |
| 1,953,300 | Holman | Apr. 3, 1934 |
| 2,295,651 | Gustofson | Sept. 15, 1942 |

FOREIGN PATENTS

| Number | Country | Date |
| --- | --- | --- |
| 320,558 | Germany | May 14, 1918 |